United States Patent Office 3,582,395
Patented June 1, 1971

3,582,395
PROTECTIVE COATINGS FOR GLASS SURFACES
Violeta F. Adams, Piscataway, N.J., Paul Lagally, Annapolis, Md., Gilbert L. Marshall, Boalsburg, Pa., and Pamela M. Rickett, Chester, Va., assignors to Brockway Glass Company, Inc., Brockway, Pa.
No Drawing. Continuation of abandoned application Ser. No. 632,435, Apr. 20, 1967. This application Feb. 2, 1970, Ser. No. 7,368
Int. Cl. C03c 17/00
U.S. Cl. 117—124
6 Claims

ABSTRACT OF THE DISCLOSURE

A method for increasing the scratch resistance of a glass surface by treating the surface, as by spraying, while at a temperature between the strain point and the softening point of the glass, with an alkylsilyl titanate, such as titanium-tetrakis-trimethylsilyl-oxide. The resulting surface film of silica-titania provdes a protective coating for the glass surface and can be top-coated with a suitable lubricating agent.

---

This application is a continuation of application Ser. No. 632,435, filed Apr. 20, 1967, now abandoned.

The present invention relates to the protection of glass surfaces against physical damage and hydrolytic corrosion by forming on such surfaces metal oxide films resulting from the decomposition of metal alkoxides.

In its broader sense, the invention comprises improved methods for the preparation of metal alkoxides and their stabilization against premature hydrolytic degradation and the conversion of these metal alkoxides into coherent oxide films by a controlled impingement on a hot glass surface.

It has been known for a long time that metal oxides deposited on hot glass surfaces form strong protective films. Suitable compounds comprise the alkoxides of aluminum, titanium, or zirconium. These alkoxides may be vaporized prior to application or they may be sprayed onto the hot glass surface. However, considerable difficulties are encountered in handling these metal alkoxides due to their tendency to hydrolyze when in contact with moist air. U.S. Pat. No. 2,831,780 describes a process which aims to circumvent these difficulties by applying the coating material in an inert gaseous atmosphere of dry nitrogen. Since it is particularly impossible to exclude moisture from spray equipment, vapor chambers and annealing lehrs, this method results in the premature formation of metal oxides such as metatitanic acid, titanium dioxide or the anologous aluminum and zirconium derivatives, causing losses in metal alkoxide, maintenance problems and the formation of metal oxide powders which are useless for the intended purpose of obtaining a coherent coating film.

More specifically, the present invention relates to the use of alkylsilyl titanates such as titanium-tetrakis-trimethylsilyl-oxide instead of the alkyl orthotitanates or their chelated derivatives ordinarily used. These alkylsilyl titanates are more stable to hydrolysis, yet on pyrolytic degradation form protective films of great hardness.

In addition, we have found that titanium esters containing alkylsilyl groups substituted for alkyl groups are useful stabilizers for titanium alkoxides conventionally used, since they readily undergo ester exchange reactions.

The greater stability to hydrolysis of certain esters of orthotitanic acid containing siloxy functional groups, as compared to unsubstituted alkyl orthotitanates, may be due to the fact that the condensation reaction takes a different course. Alkyl silanols formed by partial hydrolysis of the former compounds produce less water than carbinols resulting from partial hydrolysis of the latter which undergo olefin formation when exposed to elevated temperatures.

$$2Me_3SiOH \rightarrow Me_3SiOSiMe_3 + H_2O$$

$$Me_3COH \rightarrow Me_2C=CH_2 + H_2O$$

However, this explanation does not apply to systems where water is present in excess. It has also been suggested that the bulkiness of the trimethylsilyl group makes it more water-repellent; however, tertiary alkyl groups of comparable bulkiness are more sensitive to protonic attack. Without restricting the present disclosure to any theory of action, it is believed that the resistivity of the organosilicotitanates to hydrolysis is due to $(p \rightarrow d)\pi$ bonding with d-orbitals of the silicon atoms wherein unshared electron pairs of the oxygen atoms confer to the silicon-oxygen bonds a partial double bond character. This type of bonding, which is irrelevant to the formation of olefinic double bonds resulting in the overlap of two $\pi$-orbitals, makes these electrons less susceptible to protonic attack, resulting in a greater inherent stability to hydrolysis.

We have found that titanium-tetrakis-trimethylsilyl-oxide, $Ti(OSiMe_3)_4$, the reaction product of one mole titanium tetraisopropoxide and four moles trimethyl-acetoxysilane, is so stable that it can be distilled at normal pressure without any precautions necessary. The material thus obtained is of high purity, as supported by analytical data. It may be considered one of the rare instances of a metal alkoxide which is little affected by both heat and moisture and it is probably one of the most stable titanium esters in existence.

Alkylsilyl titanates of this type readily undergo ester exchange reactions with unsubstituted alkyl titanates, whereby the trimethylsilyl groups replace alkyl groups. Titanium alkoxides, such as titanium tetra-isopropoxide, are very sensitive to moisture, but small additions of titanium tetrakis-trimethyl silyloxide cause them to tolerate the presence of substantial quantities of water without precipitating meta-titanic acid or titanium dioxide.

The first consequence of this ester exchange is the fact that partial esters of orthotitanic acid, which contain siloxy functional groups, can be prepared by a simple mixing operation and in any quantity desired, using titanium-tetrakis-trimethylsilyloxide as a convenient starting material. Titanium bis-trimethylsilyloxide-bis-isopropoxide, for instance, is made by mixing equimolar quantities of titanium tetraisopropoxide and titanium tetrakis-trimethylsilyloxide according to the reaction $$Ti(OSiMe_3)_4 + Ti(OR)_4 \rightarrow 2\, Ti(OSiMe_3)_2(OR)_2$$

where R stands for the isopropyl group and Me for the methyl group.

Titanium-bis-trimethylsiloxy-bis-2-oxy-2-pentene-4-one is made by adding, in addition, two mole-equivalents of acetyl acetone $$Ti(OSiMe_3)_2(OR)_2 + 2C_5H_8O_2 \rightarrow Ti(OSiMe_3)_2(OC_5H_7O_2) + 2\, ROH$$

The stabilizing action of a titanium ester containing siloxy functional groups upon one containing only alkoxy groups can be described by the following equations. Due to the existing equilibrium, no more than three moles of the latter can be stabilized.

$$Ti(OSiMe_3)_4 + 3Ti(OR)_4 \rightarrow 4Ti(OSiMe_3)(OR)_3$$

However, in the presence of water titanium tetrakis-trimethylsilyoxide can tolerate much more titanium tetraisopropoxide without showing immediate signs of hydrolysis. This indicates the formation of chain-like or branched polymer molecules containing titanyl and trimethylsilyl groups. The following sequence of equations illustrates the formation of a dimeric titanium ester containing randomly distributed trimethylsilyl groups. Further polymerization or condensation reactions may lead to the formation of more intricate molecular structures. Since the amount of water, which can be tolerated is not unlimited, the presence of a suitable solvent such as isopropyl alcohol is required.

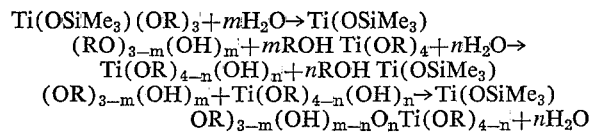

Over extended periods of time, titanium-bis-trimethylsiloxy-bis-isopropoxide has a higher apparent stability to hydrolysis than titanium tetrakis-trimethylsilyloxide. It hydrolyzes like most unchelated titanium esters to some degree, but the product first formed is isopropyl alcohol which is a water-miscible liquid. In contrast, titanium tetrakis-trimethylsilyloxide slowly forms trimethyl silanol and hexamethylidisiloxane as a second phase.

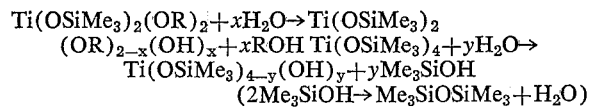

Since titanium alkylsilyloxides display increased stability to hydrolysis, they can be used with advantage to produce coating films of great hardness and chemical resistance. These films, which represent silica-titania networks, have all the advantages displayed by titania coatings such as protective and adhesive characteristics, after they have been top-coated with a lubricating agent which may comprise an organic soap or a polyethylene emulsion, as is generally required for metal oxide coatings. In addition, they are more stable to extensive exposure to heat. This is very important for fire polishing commercial glass where titania and zirconia coatings show signs of gradual deterioration as evidenced by iridescence or discoloration of the glass surface.

Finally, it was observed that a modified spray technique contributes greatly to the efficiency of the coating process. The surface strength of glass containers, as measured by the scratch load, is found to be at an optimum when the spray gun is operated with a critical air pressure. This applies to organosilico titanates as well as to other comparable coating substances and may be due to the distribution or the rate of impingement of the coating material.

The following examples serve to illustrate the scope of the invention but they should not be construed as a limitation:

EXAMPLE 1

Titanium-tetrakis-trimethylsilyloxide was prepared in a known manner except that the reaction product of isopropyl orthotitanate and trimethylacetoxysilane was rectified under normal pressure instead of performing a vacuum distillation. To 1330 grams (16.2 moles) of anhydrous sodium acetate was added 1519 grams (14.0 moles) of trimethylchlorosilane and the mixture obtained was gradually heated, with stirring, to a temperature of 100° C. The trimethylacetoxysilane was rectified through a packed column with ten theoretical plates and it distilled in a yield of 1200 grams with a boiling point of 102° C. One thousand grams (7.6 moles) trimethylacetoxysilane were then mixed with 537 grams (1.9 moles) isopropyl orthotitanate, the isopropylacetate formed as by-product was distilled off through a packed column and the titanium-tetrakis-trimethylsilyloxide was distilled in a yield of 650 grams (6.2 moles) which equals 82%. Its boiling point at 760 mm. was 235–237° C. and its composition was verified by combustion analysis:

| | Percent | | |
|---|---|---|---|
| | C | H | TiO$_2$—SiO$_2$ |
| Found | 35.53 | 8.89 | 79.56 |
| Calculated | 35.64 | 8.90 | 79.20 |

EXAMPLE 2 (PARTIAL ESTER)

Titanium-bis-trimethylsiloxy - bis - isopropoxide was made by transesterification of isopropyl orthotitanate with titanium-tetrakis-trimethylsilyloxide. Seventy-one grams isopropyl orthotitanate (0.25 mole) was mixed with 101 grams (0.25 mole) titanium-tetrakis-trimethylsilyloxide. The conversion was rapid as confirmed by the increased stability of the reaction product to hydrolysis. The material was distilled and had a constant boiling point of 93–94° C. at 3 mm. Hg and was identical with a product prepared by the reaction of two moles trimethylacetoxy silane and one mole isopropyl orthotitanate, distilling off the isopropyl acetate formed as by-product and rectifying the titanium-bis-trimethylsilyloxide-bis-isopropoxide.

EXAMPLE 3

Titanium bis-trimethylsiloxy-bis-2-oxy-2-pentene-4-one was made by mixing 404 grams (1 mole) titanium tetrakis-trimethylsilyloxide with 284 grams (1 mole) titanium tetraisopropoxide and, after shaking, adding 400 grams (4 moles) acetylacetone. After standing for a few hours, the reaction mixture changed into a crystalline mass. By removing the isopropanol under vacuum at a temperature of about 30–60° C., the crude material with a melting range of 45–52° was obtained in a yield of 95%. It is soluble in most common organic solvents. After crystallization from isopropanol, the titanium bis-trimethylsiloxy-bis-2-oxy-2-pentene-4-one melts at 51–55° C. This compound displays a high reaction rate with glass.

EXAMPLE 4

In order to stabilize titanium tetra-isopropoxide against hydrolysis, it was mixed with tetrakis-trimethylsilyl titanate in various mole ratios and to the mixtures thus obtained, was added, after diluting with isopropyl alcohol, more aqueous isopropanol. Whereas isopropyl orthotitanate hydrolyzes instantaneously, it is stabilized by the addition of trimethylsilyl orthotitanate and the mixture obtained can tolerate substantial quantities of water. A mixture of 7.95 grams (0.028 mole) isopropylorthotitanate and 1.62 grams (0.004 mole) tetrakis trimethylsilyl orthotitanate was diluted with isopropylalcohol to 32 mls. To 10 mls. to this 1 molar solution containing 0.01 mole of the mixed titanium esters was added 1 ml. 90% isopropylalcohol containing 0.1 ml. or 0.0055 mole water. The solution thus obtained stayed clear for several days. This example is a hydrolysis study of a partial ester as in Example 2.

The following table serves to illustrate the stabilizing effects which were observed by the addition of the tetrakis-trimethylsilyl orthotitanate (TS) to isopropyl orthotitanate (TPT).

| TPT:TS [1] | | Moles water per mole mixed titanium ester | Appearance after 1 day |
|---|---|---|---|
| Mole ratio | Weight ratio | | |
| 7:1 | 4.97:1.0 | .55 | Clear. |
| 7:1 | 4.97:1.0 | 1.10 | Cloudy. |
| 8:1 | 5.68:1.0 | 0.55 | Clear. |
| 8:1 | 5.68:1.0 | 1.10 | Cloudy. |
| 11:1 | 7.72:1.0 | 0.27 | Clear. |
| 11:1 | 7.72:1.0 | 0.55 | Slightly cloudy. |
| 11:1 | 7.72:1.0 | 1.10 | Cloudy. |

[1] 0.9 molar or approximately 30% solids.

EXAMPLE 5

The stabilities of titanium-tetrakis-trimethylsilyloxide and of titanium bis-trimethylsilyloxide-bis-isopropoxide to hydrolysis were compared as follows: A 0.84 molar solution of titanium-tetrakis-trimethyl-silyloxide in isopropyl alcohol, to which had been added 0.66 mole of water per mole of titanium ester, stayed clear for ten hours. The addition of 1.97 moles water caused the formation of a precipitate after one to two hours. On the other hand, the addition of 0.65 mole water to one mole of titanium-bis-trimethyl-silyloxide-bis-isopropoxide did not visibly affect its stability over a period of one week and the addition of 1.96 moles of water was tolerated for a longer period of time than by a solution of titanium tetrakis-trimethyl-silyloxide.

EXAMPLE 6

The following table lists the surface strength of glass containers which were sprayed and subsequently annealed as a function of the atomizing pressure, flow rate and gun distance from the glass surface. Titanium acetylacetonate was used as a reference substance. It is evident that the optimum strength data were obtained with an air pressure of 7 p.s.i. This is a practical example for applying to a glass surface a titania-silica coating which can be fire-polished without showing any signs of thermal degradation.

COMPARISON OF TAA¹ AND TS² FOR DIFFERENT FLOW RATES AND DEGREE OF IMPINGEMENT

Dry Scratch Load (Lbs.) for Increasing Atomizing Air Pressure (p.s.i.)

| Material | Flow rate (gal./hr.) | Gun distance from bottle (inches) | 2 | 3 | 4 | 5 | 6 | 7 | 8 | 9 | 10 |
|---|---|---|---|---|---|---|---|---|---|---|---|
| TAA | 0.16 | 5½ | 30 | 45 | 55+ | 55+ | | | | | |
| TAA | 0.08 | 5½ | | | | | 42 | 49 | 52 | | |
| TAA | 0.08 | 3 | | | | | | | 55+ | 55+ | 55+ |
| TS | 0.08 | 3 | | | | | | 55+ | 55+ | 55+ | 55+ |

Wet Scratch Load (Lbs.) for Increasing Atomizing Air Pressure (p.s.i.)

| Material | Flow rate (gal./hr.) | Gun distance from bottle (inches) | 2 | 3 | 4 | 5 | 6 | 7 | 8 | 9 | 10 |
|---|---|---|---|---|---|---|---|---|---|---|---|
| TAA | 0.16 | 5½ | 27 | 37 | 55+ | 55+ | | | | | |
| TAA | 0.08 | 5½ | | | | | 34 | 41 | 46 | | |
| TAA | 0.08 | 3 | | | | | | | 55+ | 55+ | 55+ |
| TS | 0.08 | 3 | | | | | | 55+ | 54 | 48 | 31 |

¹ TAA=Titanium acetyl acetonate.
² TS=Titanium tetrakis-trimethyl silyloxide.

We claim:
1. A method for increasing the scratch resistance of a glass surface consisting of treating said surface while at a temperature between the strain point and the softening point of the glass with an alkylsilyl titanate having titanium-oxygen-silicon-carbon bonds and not more than four carbon atoms in the chain.

2. A method according to claim 1 wherein said alkyl-silyl titanate comprises a solution containing equal molar quantities of a double ester of titaniumalkoxide and an alkylsilyl titanate.

3. A method according to claim 1 wherein said alkyl-silyl titanate comprises titanium-tetrakis-trimethylsilyl-oxide.

4. A method according to claim 1 wherein said alkyl-silyl titanate comprises the reaction product of one mole titanium tetraisopropoxide and four moles trimethyl-acetoxylsilane.

5. A method for increasing the scratch resistance of a glass surface consisting of treating said surface while at a temperature between the strain point and the softening point of the glass with an alkylsilyl titanate having titanium-oxygen-silicon-carbon bonds and selected from the group consisting of titanium-tetrakis-trimethylsilyl-oxide, titanium - bis - trimethylsiloxy-bis-isopropoxide, titanium bis-trimethylsiloxy-bis - 2 - oxy - 2 - pentene-4-one, and a mixture of tetrakis, trimethylsilyl orthotitanate and isopropyl orthotitanate.

6. A glass article having an applied surface coating of silica-titania, the silicon present in said coating being derived exclusively from a silyl titanate and not from the surface of said glass article, and an overlying coating of a lubricating agent selected from the group consisting of organic soaps and polyethylene emulsions.

References Cited

UNITED STATES PATENTS 3,051,593  8/1962  Gray et al. _____ 117—124
3,323,889  6/1967  Call et al. _____ 117—124X

OTHER REFERENCES

Field & Cowe, The Organic Chemistry of Titanium, Butterworth & Co. Ltd., 1965, p. 98.

ALFRED L. LEAVITT, Primary Examiner

W. F. CYRON, Assistant Examiner

U.S. Cl. X.R.

117—72